United States Patent
Dai et al.

(10) Patent No.: US 9,744,959 B2
(45) Date of Patent: Aug. 29, 2017

(54) ADJUSTING MOTOR TORQUE TO ENABLE SLIP OF TORQUE CONVERTER CLUTCH TO BE MAINTAINED WHEN ACCELERATOR PEDAL RELEASED IN HYBRID VEHICLE

(75) Inventors: Zhengyu Dai, Canton, MI (US); Peter John Grutter, Plymouth, MI (US); Roger Lyle Huffmaster, Canton, MI (US); Hong Jiang, Birmingham, MI (US); Felix Nedorezov, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 13/465,145

(22) Filed: May 7, 2012

(65) Prior Publication Data
US 2013/0296103 A1 Nov. 7, 2013

(51) Int. Cl.
```
B60W 10/02     (2006.01)
B60W 10/08     (2006.01)
B60W 20/00     (2016.01)
F16H 63/50     (2006.01)
F16H 61/14     (2006.01)
```
(Continued)

(52) U.S. Cl.
CPC .......... *B60W 10/026* (2013.01); *B60W 10/08* (2013.01); *B60W 20/00* (2013.01); *F16H 61/143* (2013.01); *F16H 63/50* (2013.01); *B60K 2006/4825* (2013.01); *B60W 2030/203* (2013.01); *B60W 2510/0657* (2013.01); *B60W 2540/10* (2013.01); *B60W 2710/024* (2013.01); *B60W 2710/025* (2013.01); *B60W 2710/026* (2013.01); *B60W 2710/083* (2013.01); *F16H 2061/145* (2013.01); *Y02T 10/6252* (2013.01); *Y10T 477/26* (2015.01)

(58) Field of Classification Search
CPC .... B60W 10/026; B60W 10/08; B60W 20/00; B60W 2510/0657; B60W 2030/203; B60W 2710/024; B60W 2710/025; B60W 2710/026; B60W 2710/083; B60W 2540/10; F16H 61/143; F16H 63/50; F16H 2061/145; B60K 2006/145
USPC ...... 477/5, 3, 6, 166, 174, 175, 176, 53, 52, 477/62
See application file for complete search history.

(56) References Cited

U.S. PATENT DOCUMENTS 7,637,842 B2 * 12/2009 Tamai et al. ................. 477/6
7,885,737 B2 *  2/2011 Hirata et al. ................. 701/22
(Continued)

OTHER PUBLICATIONS

The State Intellectual Property Office of People's Republic of China, The Second Office Action or the corresponding Chinese Patent Application No. 201310165109.6 dated Feb. 24, 2017.
(Continued)

*Primary Examiner* — David J Hlavka
(74) *Attorney, Agent, or Firm* — David B. Kelley; Brooks Kushman P.C.

(57) ABSTRACT

A controller and a control strategy for a hybrid electric vehicle having a traction motor between an engine and an automatic transmission include maintaining a bypass clutch of a torque converter in an engaged position and applying a motor torque from a traction motor to the torque converter such that slip of the torque converter does not otherwise reach zero while the bypass clutch is maintained in the engaged position.

5 Claims, 2 Drawing Sheets

(51) Int. Cl.
*B60W 30/20* (2006.01)
*B60K 6/48* (2007.10)

(56) References Cited

U.S. PATENT DOCUMENTS

| | | | |
|---|---|---|---|
| 8,061,463 B2* | 11/2011 | Kitano et al. | 180/65.285 |
| 8,398,526 B2* | 3/2013 | Hrovat et al. | 477/180 |
| 2008/0064561 A1* | 3/2008 | Popp et al. | 477/5 |
| 2009/0124453 A1 | 5/2009 | Seel et al. | |
| 2010/0227734 A1 | 9/2010 | Wallner et al. | |
| 2010/0304923 A1* | 12/2010 | Schenk et al. | 477/5 |
| 2011/0276239 A1 | 11/2011 | Nagashima et al. | |
| 2013/0012353 A1* | 1/2013 | Yoshida et al. | 477/5 |
| 2013/0023379 A1* | 1/2013 | Bucknor et al. | 477/5 |

OTHER PUBLICATIONS

The State Intellectual Property Office, First Office Action for the corresponding Chinese Patent Application No. 201310165109.6 dated Aug. 1, 2016.

The State Intellectual Property Office, English Translation for the first Office Action for the corresponding Chinese Patent Application No. 201310165109.6 dated Aug. 1, 2016.

\* cited by examiner

ADJUSTING MOTOR TORQUE TO ENABLE SLIP OF TORQUE CONVERTER CLUTCH TO BE MAINTAINED WHEN ACCELERATOR PEDAL RELEASED IN HYBRID VEHICLE

TECHNICAL FIELD

The present invention relates to controlling motor torque in a hybrid vehicle powertrain in the presence of changes in driver demand.

BACKGROUND

A hybrid vehicle powertrain includes an engine and an electric motor, wherein torque (or power) produced by the engine and/or by the motor can be transferred to the vehicle drive wheels through a transmission. A traction battery or other electrical power source connected to the motor supplies energy to the motor for the motor to produce the motor torque. The motor may provide a negative motor torque to the transmission (for example, during regenerative braking) and thereby act as a generator to store electrical energy in the battery.

In a configuration sometimes referred to as a modular hybrid transmission ("MHT") configuration, the engine is connectable to the motor by a disconnect clutch and the motor is connected to the transmission. The motor may be connected to the transmission via a torque converter having a torque converter clutch. The engine, the disconnect clutch, the motor, the torque converter, and the transmission are connected sequentially in series.

Operation with the torque converter bypass clutch disengaged provides a hydrodynamic coupling that provides torque multiplication and damping of driveline disturbances, but also reduces energy efficiency of the vehicle. Engagement or locking of the torque converter bypass clutch eliminates the hydrodynamic coupling and torque multiplication of the torque converter to reduce losses and improve energy efficiency, but may transmit torque disturbances from the engine or the motor through the driveline. As such, it is desirable to control the torque converter bypass clutch position to operate in a reduced slip, disengaged position. Modulation of the torque converter bypass clutch to operate in a reduced slip position near engagement reduces losses and contributes to improved energy efficiency while also providing some damping of driveline disturbances. However, various vehicle operating conditions may result in the torque converter slip approaching zero and the torque converter transmitting driveline torque disturbances, such as torque reversals associated with accelerator pedal tip-out and vehicle coasting or braking, for example.

SUMMARY

Embodiments of the present invention are directed to a controller and a control strategy for a hybrid electric vehicle having an engine, an electric motor, a torque converter with a torque converter clutch, and a transmission. The controller and the control strategy adjust the motor torque to maintain controlled slip to damp driveline torque disturbances without disengaging the converter clutch during certain vehicle operating conditions. For instance, the motor torque is increased to maintain slip of the torque converter clutch after the driver releases the accelerator pedal of the vehicle and the vehicle begins to coast.

Typically, in such a situation, the torque converter clutch is disengaged to allow the torque converter to absorb driveline disturbances caused by the accelerator pedal being released. Alternatively, the torque converter clutch is maintained in the engaged position and the slip in the torque converter reaches zero as a result of the accelerator pedal being released. In this case, the driveline disturbances will be felt due to the direct torque path through the torque converter.

In contrast to the typical operation occurring as a result of the accelerator pedal being released, the controller and the control strategy in accordance with embodiments of the present invention maintain the torque converter clutch in the engaged position and control the motor to generate a relatively small additional amount of motor torque which is supplied to the torque converter to prevent the slip in the torque converter from becoming smaller and reaching zero. As a result, the torque converter has enough slip to absorb the driveline disturbances while at the same time being maintained at or near its engaged position.

In an embodiment, a method is provided. The method includes maintaining a bypass clutch of a torque converter in a position and applying a motor torque from a motor to the torque converter such that slip of the torque converter does not otherwise decrease and reach zero while the bypass clutch is maintained in the position.

The maintained position of the bypass clutch may be an engaged, but unlocked position. The motor torque may be applied to the torque converter while the bypass clutch is maintained in the engaged position in lieu of moving the bypass clutch from the engaged position to a disengaged position to increase the slip of the torque converter.

The bypass clutch may be maintained in position upon an accelerator pedal being released. The bypass clutch may be maintained in position upon engine torque from an engine being reduced.

The bypass clutch may be moved from the engaged position to a disengaged position while the slip of the torque converter is above a threshold in lieu of maintaining the bypass clutch in the engaged position and applying the motor torque. The bypass clutch may be moved from the engaged position to a disengaged position while a level of engine torque is above a threshold in lieu of maintaining the bypass clutch in the engaged position and applying the motor torque. The bypass clutch may be moved from the engaged position to a disengaged position while a rate of change of engine torque is above a threshold in lieu of maintaining the bypass clutch in the engaged position and applying the motor torque.

In an embodiment, a system is provided. The system includes a controller configured to maintain a bypass clutch of a torque converter in an engaged position and apply a motor torque from a motor to the torque converter such that slip of the torque converter does not otherwise reach zero while the bypass clutch is maintained in the engaged position.

In an embodiment, a hybrid electric vehicle is provided. The vehicle includes an engine, an electric motor, a torque converter having a bypass clutch, a transmission, and a controller. The controller is configured to maintain the bypass clutch in an engaged position and apply a motor torque from the motor to the transmission via the torque converter such that slip of the torque converter does not otherwise reach zero while the bypass clutch is maintained in the engaged position.

Additional objects, features, and advantages of embodiments of the present invention will become more readily apparent from the following detailed description when taken in conjunction with the drawings, wherein like reference numerals refer to corresponding parts.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
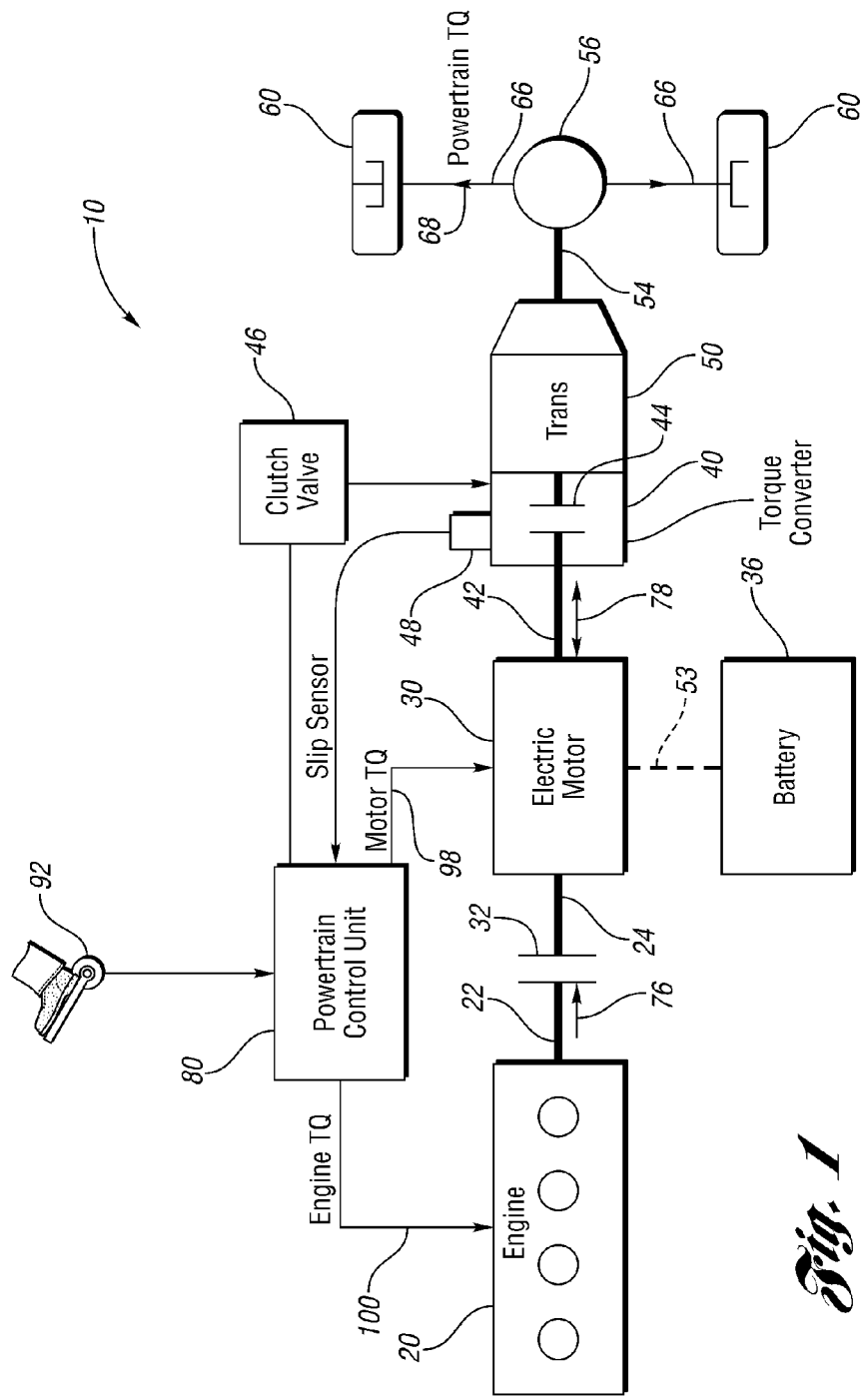
FIG. 1 illustrates a block diagram of an exemplary hybrid vehicle powertrain in accordance with an embodiment of the present invention.

Referring now to FIG. 1, a block diagram of an exemplary powertrain system 10 for a hybrid electric vehicle in accordance with an embodiment of the present invention is shown. Powertrain system 10 includes an engine 20, an electric machine such as an electric motor/generator 30 ("motor"), a traction battery 36, a torque converter 40, and a multiple-ratio automatic transmission 50.

Engine 20 and motor 30 are drive sources for the vehicle. Engine 20 is connectable to motor 30 through a disconnect clutch 32 whereby engine 20 and motor 30 are connected in series. Motor 30 is connected to torque converter 40. Torque converter 40 is connected to engine 20 via motor 30 when engine 20 is connected to motor 30 via disconnect clutch 32. Transmission 50 is connected to the drive wheels 60 of the vehicle. The driving force applied from engine 20 and/or motor 30 is transmitted through torque converter 40 and transmission 50 to drive wheels 60 thereby propelling the vehicle.

Torque converter 40 includes an impeller rotor fixed to output shaft 42 of motor 30 and a turbine rotor fixed to the input shaft of transmission 50 (not shown). The turbine of torque converter 40 can be driven hydro-dynamically by the impeller of torque converter 40. Thus, torque converter 40 may provide a hydraulic coupling between output shaft 42 of motor 30 and the input shaft of transmission 40.

Torque converter 40 further includes a torque converter clutch 44 (i.e., a bypass clutch 44). Converter clutch 44 is controllable between an engaged position (i.e., a lock-up position, an applied position, etc.) and a disengaged position (i.e. an unlocked position, etc.). In the engaged position, converter clutch 44 frictionally couples the impeller and the turbine of torque converter 40, which eliminates the hydraulic coupling and torque multiplication between these components. In the disengaged position, converter clutch 44 permits the hydraulic coupling between the impeller and the turbine of torque converter 40.

When torque converter clutch 44 is disengaged, the hydraulic coupling between the impeller and the turbine of torque converter 40 absorbs and attenuates unacceptable vibrations and other disturbances in the powertrain. The source of such disturbances includes the engine torque applied from engine 20 for propelling the vehicle. However, fuel economy of the vehicle is reduced when converter clutch 44 is disengaged due to the losses associated with the hydraulic coupling and associated torque multiplication. Thus, it is desired that converter clutch 44 be engaged when possible to increase vehicle fuel/energy efficiency.

Torque converter clutch 44 may be controlled through operation of a clutch valve 46, which may be implemented by a pulse width modulated solenoid valve, for example. In response to a control signal, clutch valve 46 pressurizes and vents converter clutch 44 to engage and disengage the frictional coupling between the impeller and turbine. The apply pressure of converter clutch 44 can be controlled so that converter clutch 44 is neither fully engaged nor fully disengaged and instead is modulated to produce a variable magnitude of slip between the impeller and turbine in torque converter 40. The slip of torque converter 40 corresponds to the difference in the speeds of the impeller and the turbine of torque converter 40. The slip of torque converter 40 approaches zero as converter clutch 44 approaches the fully engaged position. Conversely, the magnitude of the slip of torque converter 40 becomes larger as converter clutch 44 moves toward the disengaged position.

When operated to produce a variable magnitude of slip, torque converter 40 can be used to absorb vibrations (for example, when gear ratio changes are being made, when the driver releases pressure from the accelerator pedal, etc.) by increasing the slip, thus causing a greater portion of the engine torque to be passed from the impeller to the turbine of torque converter 40 through hydro-dynamic action. Converter clutch 44 can be more fully engaged so that fuel economy is enhanced without significantly impacting driveability when the current ambient and/or vehicle operating conditions have a lower probability of generating torque disturbances. However, again, as noted above, it is desired that converter clutch 44 be engaged when possible as the fuel economy/energy efficiency of the vehicle is increased when converter clutch 44 is engaged.

As indicated above, engine 20 is connectable to motor 30 through disconnect clutch 32. In particular, engine 20 has an engine shaft 22 connectable to an input shaft 24 of motor 30 through disconnect clutch 32. As further indicated above, output shaft 42 of motor 30 is connected to the impeller of torque converter 40. The turbine of torque converter 40 is connected to the input shaft of transmission 50.

Transmission 50 includes multiple discrete gear ratios. Transmission 50 includes an output shaft 54 that is connected to a differential 56. Drive wheels 60 are connected to differential 56 through respective axles 66. With this arrangement, transmission 50 transmits a powertrain output torque 68 to drive wheels 60.

Engine 20 is a primary source of power for powertrain system 10. Engine 20 is an internal combustion engine such as a gasoline, diesel, or natural gas powered engine. Engine 20 generates an engine power and corresponding engine torque 76 that is supplied to motor 30 when engine 20 and motor 30 are connected via disconnect clutch 32. The engine power corresponds to the product of engine torque 76 and the engine speed of engine 20. To drive the vehicle with engine 20, at least a portion of engine torque 76 passes from engine 20 through disconnect clutch 32 to motor 30 and then from motor 30 through torque converter 40 to transmission 50.

Traction battery 36 is a secondary source of power for powertrain system 10. Motor 30 is linked to battery 36 through wiring 53. Depending on the particular operating mode of the vehicle, motor 30 either converts electric energy stored in battery 36 into a motor power having a motor torque 78 or sends a corresponding amount of electrical power to battery 36. The motor power corresponds to the product of motor torque 78 and the motor speed of motor 30. To drive the vehicle with motor 20, motor torque 78 is also sent through torque converter 40 to transmission 50. When generating electrical power for storage in battery 36, motor 30 obtains power either from engine 20 in a driving mode or from the inertia in the vehicle as motor 30 acts as a brake in what is referred to as a regenerative braking mode.

As described, engine 20, disconnect clutch 32, motor 30, torque converter 40, and transmission 50 are connectable sequentially in series as illustrated in FIG. 1. As such, powertrain system 10 represents a modular hybrid transmission ("MHT") configuration in which engine 20 is connected to motor 30 by disconnect clutch 32 with motor 30 being connected to transmission 50 through torque converter 40.

Depending on whether disconnect clutch 32 is engaged or disengaged determines which input torques 76 and 78 are transferred to transmission 50. For example, if disconnect clutch 32 is disengaged, then only motor torque 78 is supplied to transmission 50. If disconnect clutch is engaged, then both engine torque 76 and motor torque 78 are supplied to transmission 50. Of course, if only engine torque 76 is desired for transmission 50, disconnect clutch 32 is engaged, but motor 30 is not energized such that engine torque 76 is only supplied to transmission 50.

Transmission 50 includes planetary gear sets (not shown) that are selectively placed in different gear ratios by selective engagement of friction elements (not shown) to establish the desired multiple discrete drive ratios. The friction elements are controllable through a shift schedule that connects and disconnects certain elements of the planetary gear sets to control the ratio between the transmission output and the transmission input. Transmission 50 is automatically shifted from one ratio to another based on the needs of the vehicle. Transmission 50 then provides powertrain output torque 68 to output shaft 54 which ultimately drives drive wheels 60. The kinetic details of transmission 50 can be implemented by a wide range of transmission arrangements. Transmission 50 is an example of a transmission arrangement for use with embodiments of the present invention. Any multiple ratio transmission that accepts input torque(s) from an engine and/or a motor and then provides torque to an output shaft at the different ratios is acceptable for use with embodiments of the present invention.

Powertrain system 10 further includes a powertrain controller 80 which constitutes a vehicle system controller. An accelerator pedal 92 is used by the driver of the vehicle to provide a demanded torque or drive command to propel the vehicle. In general, depressing pedal 92 generates an accelerator pedal position signal that may be interpreted as a demand for increased power. Similarly, the less the driver depresses pedal 92, the corresponding pedal position signal is generally interpreted as a request for decreased vehicle power. Completely releasing pedal 92 may allow the vehicle to coast, or may be interpreted as a request for light engine/motor braking depending on the particular application and implementation.

Controller 80 apportions the total drive/power command between an engine torque signal 100 (which represents the amount of engine torque 76 to be provided from engine 20, operating at a corresponding engine speed, to transmission 50) and a motor torque signal 98 (which represents the amount of motor torque 78 to be provided from motor 30, operating at a corresponding motor speed, to transmission 50). In turn, engine 20 generates engine torque 76 and motor 30 generates motor torque 78 for transmission 50 to propel the vehicle. Such engine torque 76 and motor torque 78 for propelling the vehicle are "positive" torques. However, both engine 20 and motor 30 may generate "negative" torques for transmission 50 to brake the vehicle.

Controller 80 is further configured to control clutch valve 46 to in turn control operation of torque converter clutch 44 of torque converter 40. Controller 80 controls the operation of torque converter 40 such that converter clutch 44 is modulated across a range between the engaged and disengaged positions to produce a variable magnitude of slip in torque converter 40. Again, the slip of torque converter 40 corresponds to the difference between the input rotational speed and the output rotational speed of torque converter 40. The output rotational speed approaches the input rotational speed as converter clutch 44 approaches the engaged position such that the slip is zero when converter clutch 44 is in the fully engaged position. Conversely, the output rotational speed diverges from the input rotational speed as converter clutch 44 approaches the disengaged position such that the magnitude of the slip becomes larger. The magnitude of the slip may be measured or estimated using one or more corresponding sensors and operating parameters. For example, motor current or a corresponding motor output speed sensor may be used to determine the impeller speed. A turbine speed sensor may be used to determine the transmission input speed. Similarly, a transmission output shaft speed sensor or one or more wheel speed sensors may be used to infer the transmission input speed using the current gear ratio. As used herein, one or more sensors may collectively be referred to as a slip sensor 48 configured to sense the slip of torque converter 40 and provide information indicative of the slip to control unit 80.

Figure 2:
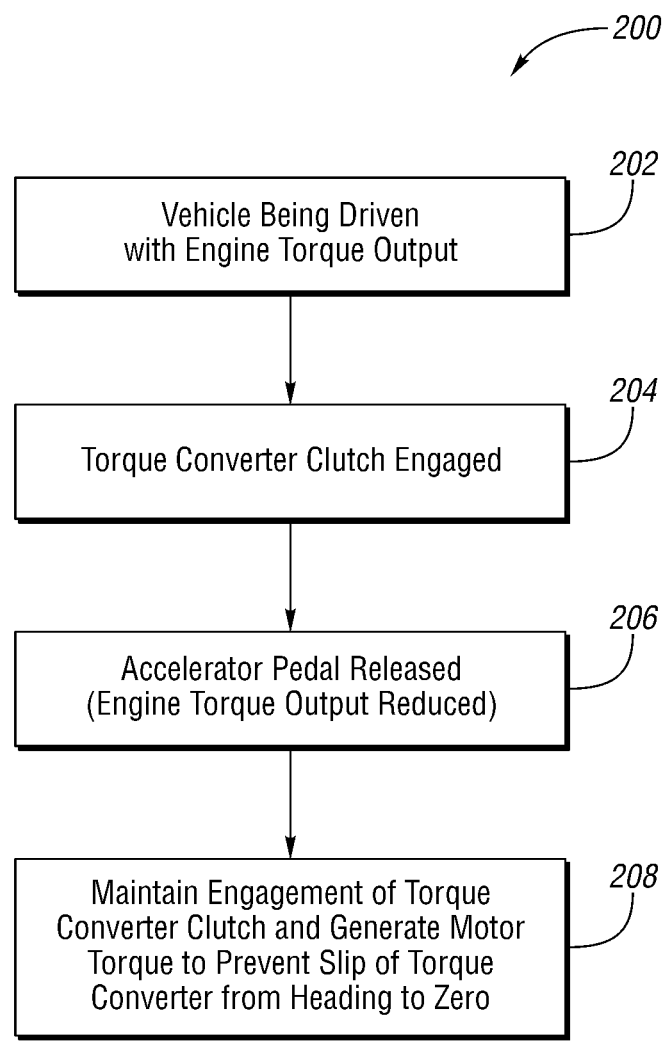
FIG. 2 illustrates a flowchart describing operation of a control strategy for adjusting the torque of the motor to enable slip of the torque converter clutch to be maintained in accordance with an embodiment of the present invention.

Referring now to FIG. 2, with continual reference to FIG. 1, a flowchart 200 describing operation of a control strategy for adjusting motor torque 78 of motor 30 to enable slip of torque converter clutch 44 of torque converter 40 to be maintained in accordance with an embodiment of the present invention is shown.

In one embodiment, the control strategy is operative when the vehicle is being propelled with engine torque 76 from engine 20 as indicated in block 202. Motor torque 78 from motor 30 may or may not be provided to supplement engine torque 76 to propel the vehicle during this time. In either event, the total input torque (i.e., engine torque 76 and, if any, motor torque 78) for propelling the vehicle corresponds to the total drive command which is based on the position of accelerator pedal 92.

As indicated above, it is desired that torque converter clutch 44 be close to its engaged position whenever possible to increase fuel economy. Thus, after the driver has been depressing accelerator pedal 92 for some time and the vehicle has reached a sufficient velocity, controller 80 controls converter clutch 44 to be close to its engaged position as indicated in block 204. As a result, the magnitude of the slip of torque converter 40 is relatively small, which provides acceptable driveability as engine torque disturbances and the like are likely to be minimal during this time.

At some point subsequent to blocks 202 and 204, the driver releases accelerator pedal 92 as indicated in block 206. The driver may release accelerator pedal 92 to let the vehicle coast or to enable vehicle braking to take place. In either event, as the driver releases accelerator pedal 92 the total drive command is reduced and engine torque 76 from engine 20 is reduced accordingly. The reduction of engine torque 76 causes the slip of torque converter 40 to become smaller and reach zero if torque converter clutch 44 remains near its engaged position set forth in block 204 without any adjustment. A zero slip condition may result in transmittance of undesirable torque disturbances into the vehicle structure. However, a small non-zero amount of slip in torque converter 40 provides some damping such that any harsh vibration is not transferred to the vehicle cabin.

As will be explained below, the control strategy provides an adjustment technique such that the slip of torque converter 40 does not reach zero during the reduction of engine torque 76 with converter clutch 44 being near its engaged position set forth in block 204. Typically, as the reduction of engine torque 76 occurs upon the driver releasing accelerator pedal 92, converter clutch 44 is controlled to be moved toward its disengaged position to introduce slip in torque converter 40. This slip is generated to absorb driveline disturbances caused by the reduction and/or the rate of change in engine torque 76 as a result of accelerator pedal 92 being released, and also to prevent the transmission of engine combustion pulses when accelerator pedal 92 is again depressed. For example, driveline disturbances may be caused from combustion pulses from engine 20 that occur during normal driving and also from the change in engine torque 76 as a result of accelerator pedal 92 being released.

In contrast to the typical operation, the control strategy maintains torque converter clutch 44 near its engaged position set forth in block 204 and controls motor 30 to generate a relatively small amount of motor torque 78 to prevent the slip of torque converter 40 from decreasing and becoming smaller and reaching zero as indicated in block 208. That is, instead of controlling converter clutch 44 to move out of its engaged position set forth in block 204 towards its disengaged position to create slip in torque converter 40 pursuant to the typical operation, motor 30 is controlled to generate an increased component of motor torque 78 to prevent the slip of torque converter 40 from becoming smaller and reaching zero. This relatively small amount of additional motor torque generated by motor 30 is applied from motor 30 to torque converter 44 and may be a positive or negative input torque as the situation requires.

The criteria for controlling motor 30 to enable engagement of torque converter clutch 44 to be maintained in block 208 in an embodiment of the present invention includes the following. The torque level and the rate of change of engine torque 76 from engine 20 are monitored. If specific thresholds are exceeded and the amount of slip in torque converter 40 is below a specified value, then motor 30 is engaged to add a small amount of motor torque to prevent the slip of torque converter 40 from reaching zero.

Thus, motor 30 is used to keep torque converter clutch 44 in a mode (i.e., near its engaged position set forth in block 204) where converter clutch 44 can maintain fuel economy while engine torque variations are smoothed out by the additional motor torque component generated. In order to control the amount of torque output from motor 30, an input/output control line may be added to the engine control loop.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method of controlling a vehicle having a motor and a transmission having a torque converter with a clutch, comprising:
engaging the clutch to a partially-engaged position providing a non-zero slip;
while the clutch in response to a decrease in driver demand torque would otherwise move to a fully-engaged position providing a zero slip, controlling torque of the motor to increase the slip to be non-zero instead of disengaging the clutch to increase the slip.

2. The method of claim 1 wherein engaging comprises modulating a clutch pressure control signal to partially engage the clutch.

3. The method of claim 1 further comprising:
disengaging the clutch when the slip exceeds an associated threshold.

4. A system for controlling a hybrid vehicle having a traction motor between an engine and a transmission having a torque converter with a bypass clutch, comprising:
a controller configured to engage the bypass clutch to a partially-engaged position providing a non-zero slip and, while the clutch in response to a decrease in driver demand torque would otherwise approach a fully-engaged position providing a zero slip, control motor torque of the traction motor to increase the slip to be non-zero in lieu of disengaging the clutch being to increase the slip.

5. A hybrid electric vehicle comprising:
an electric motor;
a torque converter having a bypass clutch;
a controller configured to engage the bypass clutch to a partially-engaged position providing a non-zero slip and, while the clutch in response to a decrease in driver demand torque would otherwise approach a fully-engaged position providing a zero slip, apply a motor torque from the electric motor to increase the slip to be non-zero in lieu of disengaging the clutch to increase the slip.

\* \* \* \* \*